(12) United States Patent
Dezonno

(10) Patent No.: US 7,110,526 B1
(45) Date of Patent: Sep. 19, 2006

(54) NEURAL NETWORK FOR CONTROLLING CALLS IN A TELEPHONE SWITCH

(75) Inventor: Anthony J. Dezonno, Chicago, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 09/172,362

(22) Filed: Oct. 14, 1998

(51) Int. Cl.
H04M 3/00 (2006.01)
H04M 5/00 (2006.01)

(52) U.S. Cl. .............................. 379/266.01; 379/265.02
(58) Field of Classification Search ................ 379/265, 379/225, 266, 309
See application file for complete search history.

(56) References Cited

U.S. PATENT DOCUMENTS

| | | | |
|---|---|---|---|
| 4,881,261 A | 11/1989 | Oliphant et al. ............ 379/215 |
| 4,972,473 A | 11/1990 | Ejiri et al. ..................... 380/20 |
| 5,155,763 A | 10/1992 | Bigus et al. ................. 379/113 |
| 5,185,780 A | 2/1993 | Leggett ........................ 379/34 |
| 5,214,688 A | 5/1993 | Szlam et al. ................... 379/67 |
| 5,295,184 A | 3/1994 | Smith et al. ................. 379/216 |
| 5,327,490 A | 7/1994 | Cave .......................... 379/216 |
| 5,343,518 A | 8/1994 | Kneipp ....................... 379/355 |
| 5,436,963 A | 7/1995 | Fitzpatrick et al. ......... 379/212 |
| 5,436,965 A | 7/1995 | Grossman et al. .......... 379/266 |
| 5,444,820 A | 8/1995 | Tzes et al. ..................... 395/22 |
| 5,461,699 A | 10/1995 | Arbabi et al. ................. 395/23 |
| 5,467,391 A | 11/1995 | Donaghue, Jr. et al. .... 379/265 |
| 5,546,456 A * | 8/1996 | Vilsoet et al. ............... 379/265 |
| 5,561,711 A | 10/1996 | Muller ........................ 379/266 |
| 5,570,419 A | 10/1996 | Cave et al. .................. 379/216 |
| 5,586,033 A | 12/1996 | Hall ....................... 364/424.07 |
| 5,590,188 A * | 12/1996 | Crocket ....................... 379/225 |
| 5,592,543 A | 1/1997 | Smith et al. ................. 379/265 |
| 5,621,790 A | 4/1997 | Grossman et al. .......... 379/266 |
| 5,729,660 A | 3/1998 | Chiabrera et al. ............ 395/22 |
| 5,751,915 A | 5/1998 | Werbos ........................ 395/61 |
| 5,765,028 A | 6/1998 | Gladden ....................... 395/11 |
| 5,774,631 A | 6/1998 | Chiabrera et al. ............ 395/22 |
| 5,848,145 A | 12/1998 | Gallagher et al. .......... 379/220 |
| 5,864,617 A * | 1/1999 | Donnelly ..................... 379/266 |
| 5,905,789 A | 5/1999 | Will ............................ 379/211 |
| 5,978,465 A * | 11/1999 | Corduroy et al. ........... 379/265 |

* cited by examiner

Primary Examiner—William J. Deane, Jr.
(74) Attorney, Agent, or Firm—Welsh & Katz, Ltd.

(57) ABSTRACT

A method and apparatus are provided for processing calls in an automatic call distributor. The method includes the steps of learning a set of desired resource relationships for servicing a plurality of call processing load conditions in the automatic call distributor and, afterwards, distributing resources of the automatic call distributor based upon call processor loading and the learned desired set of resource relationships.

32 Claims, 1 Drawing Sheet

NEURAL NETWORK FOR CONTROLLING CALLS IN A TELEPHONE SWITCH

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the automatic call distributor (ACD) may distribute the calls based upon which agent position (telephone) has been idle the longest.

In order to distribute incoming calls from the PSTN to the available agents, the interaction of a controlling computer with a switching fabric of the ACD becomes essential. Often a connection of the ACD to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue of the selected agent (or group of agents) or directly to the selected agent. At the same time that the call is delivered to the agent, the controller sends an identifier of the selected agent and ANI number of the customer to a controller of the database (the host). The host, in turn, displays the customer records on a computer monitor of the terminal of the selected agent at the same time the call is delivered.

While the existing method of ACD operation is relatively satisfactory, the relative loading of agent groups varies widely. Often sales campaigns are launched involving some agents of a selected number of agent groups. Other times, agents may be drafted for outbound call campaigns based upon availability. However, the varying levels of call processing may intermittently leave agents handling incoming calls idle. Other times, incoming calls may overwhelm agents designated for accepting such calls. Accordingly, a need exists for a means of dynamically adapting operating resources of automatic call distributors to changing circumstances, such that the dynamic nature of call processing may be accommodated without difficulty.

SUMMARY

A method and apparatus are provided for processing calls in an automatic call distributor. The method includes the steps of learning a set of desired resource relationships for servicing a plurality of call processing load conditions in the automatic call distributor and, afterwards, distributing resources of the automatic call distributor based upon call processor loading and the learned desired set of resource relationships.

DETAILED DESCRIPTION OF A PREFERRED EMBODIMENT

Figure 1:
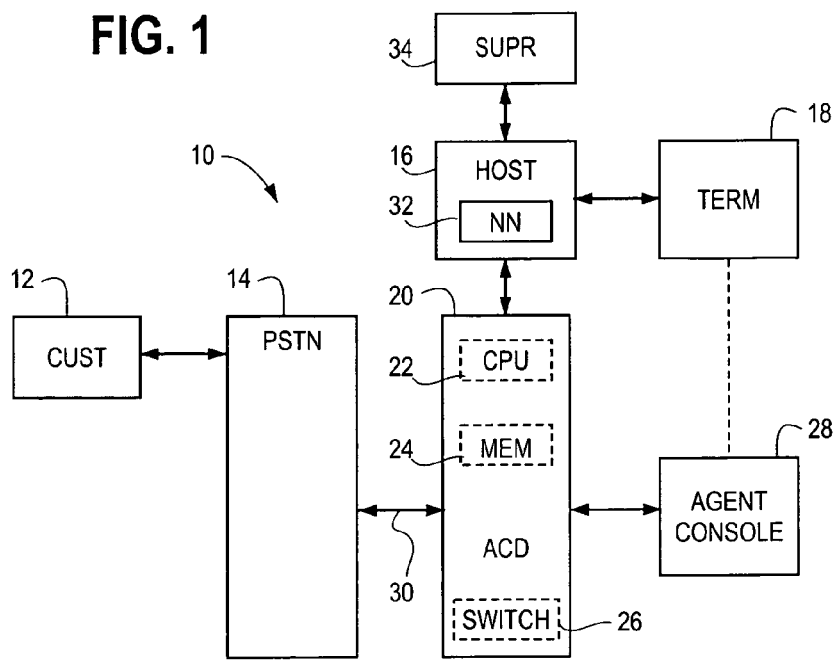
FIG. 1 is a block diagram of an automatic call distributor in accordance with an illustrated embodiment of the invention.

FIG. 1 is a block diagram of an automatic call distributor (ACD) system 10, generally, in accordance with an illustrated embodiment of the invention. The ACD 10 may include a call distributor (CD) 20 coupled to the PSTN 14 through a number of trunk lines 30. The CD 20 may route calls received from the PSTN 14 to a number of agent consoles 28 (one shown in FIG. 1) under the control of a host 16. The host 16 may include one or more neural networks (NN) 32. Each agent console 28 has associated with it, an agent terminal 18 coupled to a database within the host 16.

Under the embodiment, the ACD 10 may direct calls from a number of customers 12 (one shown in FIG. 1) to a number of agents (one agent station 18, 28 shown in FIG. 1), or calls from a number of agents to a number of customers under the control of the NN 32.

Calls from customers 12 may be initiated from subscriber locations anywhere within the PSTN 14 and routed by the PSTN 14 to the ACD 10. To facilitate delivery of calls, an owner of the ACD 10 may disseminate by advertising or otherwise, an address for delivery of calls. In the case of calls, the address may simply be a telephone number.

Under the illustrated embodiment, calls delivered from the PSTN 14 to the ACD 10 under voice format may be handled conventionally. The ACD 10 may include a switch 26, which may be interconnected with the PSTN 14 through a number of trunk lines 30. The PSTN 14 may offer service on the trunk lines 30 in association with services such as ANI or DNIS. Call control, call maintenance, and call set-up may be accomplished over the trunk line itself or over an associated control channel.

DNIS information supplied by the PSTN 14 is useful where inbound calls to the ACD 10 may be directed to any of a large block of telephone numbers assigned to the ACD 10. Calls of the block of numbers may be delivered to the ACD 10 through the trunk lines 30 in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

The switch 26 is controlled by a central processing unit, or CPU 22, in conjunction with peripheral memory device 24. Control of the switch 26 and communications with the host 16 and PSTN 14 may be accomplished generally as described in U.S. Pat. No. 5,268,903, and U.S. Pat. No. 5,140,611, both to Jones, and both incorporated herein by reference. Routing of calls to agents 28 and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 22 monitors each port of the switch 26 for changes in status. A change in status may be an agent unit 28 going off-hook to make a call, an agent unit hanging up after a call, or it may be a call alerting tone detected on a trunk, alerting the CPU 22 to the presence of an incoming call.

Where the status change is an agent 28 hanging up, the CPU 22 acts to tear-down the call connection within the switch 26 between the agent at a first port of the switch and a second party to the conversation communicating through a second port of the switch 26. Upon tear down of the connection, the CPU 22 also sends a message to the host 16, notifying the host of termination of the call connection. The message to the host 16 includes at least the identity of the agent 28.

Where the status change is a call alert signal on an incoming trunk line (or control channel associated with the incoming trunk line), the CPU 22 may send a call arrival message to the host 16 (and NN 32). Based upon system loading, the host 16 may authorized the CD 20 to accept the call. Upon receiving authorization to accept the call, the CD 20 sends an acknowledge message to the PSTN 14 accepting the call. The PSTN 14 may respond by forwarding DNIS and ANI information, identifying the called and calling party.

Upon accepting the call, the CPU 22 first stores the DNIS and ANI numbers in a termination table of the memory 24. More specifically, the CPU 22 maintains a table of call information for each port of the switch 26. Where a call is accepted on an incoming trunk line, the CPU 22 enters the DNIS and ANI number into the table for the incoming trunk line upon which the call is received.

In addition to updating the termination table within memory 24, the CPU 22 also generates a call identifier (also sometimes referred to as a call ID or sequence number) for the call, unique to the switch 26. The call identifier along with the ANI and DNIS numbers may then be sent to the host 16 as part of a call arrival message. The call arrival message includes a header identifying the message as being a call arrival message. The message may also include an ANI number, DNIS information and the call identifier.

Delivery of the ANI and DNIS numbers and call identifier allows the host 16 to create a unique call record for the call in memory 24, in a call record area of memory 24. The call record (and specifically the ANI information within the call record) may be used to retrieve customer records for delivery to an appropriate display terminal 18 once the call has been assigned to an agent 28.

The CPU 22 then, by reference to the DNIS number, determines the identity of an agent 28 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

The CPU 22 may maintain a series of lookup tables within memory 24 identifying groups and agents within each group. A header of each lookup table may identify the DNIS numbers of calls to be directed to the group.

Each group lookup table may contain a list of identifiers of agents assigned to the group. Agents may be added to or deleted from a group under control of the NN 32.

Also contained within each group list is a status indicator of each agent. Agents may be selected based upon availability or qualifications.

Upon determining the identity of the agent 28 (or group of agents) the CPU 22 instructs the switch 26 to internally connect the port of the incoming trunk to a port of one of the identified agents.

Where the call has been connected to an agent, the CPU 22 stores the port number of the identified agent in the termination table for the port of the incoming trunk. Likewise, the CPU 22 stores the port identifier of the incoming trunk in the termination table of the identified agent.

To complete set-up of the call to the identified agent, the CPU 22 sends a call completion message to the host 16. The call completion message may include a header identifying the message as being a call completion message. The call completion message may also include at least a port identifier of the identified agent and the call identifier. The information of the call completion message is stored in the call record previously created in conjunction with call arrival. The port identifier and call identifier allows the host 16 to deliver customer data to the specific display terminal of the agent to which the call was delivered.

Included within the host 16 is one or more NNs 32 which control system resources (e.g., the number of agents in a particular agent group, the number of incoming calls per time period accepted by the system 10, the number of outgoing calls initiated by the system 10, the number of calls in the queue of each group, etc.). Each NN 32 may be created and organized in a manner well known in the art (e.g., see "AS/400 Neural Network Utility: User's Guide and Reference PRPQ P84189").

The NN 32 may perform an analysis of resource allocation periodically (e.g., one every 10 seconds, once an hour, etc.), or upon the receipt of each call request. As used herein, a call request may be an incoming call from the PSTN 14 or an outgoing call initiated by the host 16 as part of a call campaign.

Under the illustrated embodiment, the NN 32 may receive input information on system operation from any number of sources (e.g., from the CD 20, supervisors station 34, etc.). Information received from the CD 20 may include: the number of agents signed onto the system 10, the number of agents available for accepting calls, the delay time which a call experiences before delivery to an agent, an average time a call experiences before answering, an average talk time, a time of day, day of week, etc.

Based upon that information, the NN 32 may assign agents to groups or transfer agents among groups, based upon group loading. The NN 32 may also initiate and control outgoing call campaigns in conjunction with the control of the agent groups. Further, the NN 32 may also control the rate at which the CD 20 accepts calls from the PSTN 14.

Figure 2:
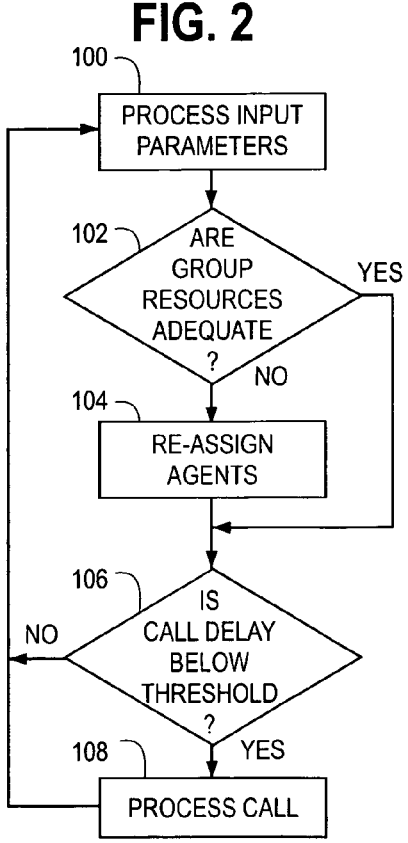
FIG. 2 is a flow chart of process steps performed by the system of FIG. 1.

FIG. 2 is a flow chart of neural network operation. As shown, the NN 32 may begin by processing 100 the input information to determine a system status. Following a determination of system status, the NN 32 checks to see if group resources are adequate 102.

The determination of whether or not group resources are adequate may be determined by examination of a call queue for each group. Where calls remain in the call queue for an excessive period of time, the NN 32 may determine that the resources of the group are inadequate and that more resources should be allocated to the group.

For example, the NN 32 may first identify the group with the longest and shortest delay of calls in its respective call queue. If the difference is one second or less the NN 32 may determine that the resources are adequate and that no action is needed. Alternatively, if the delay is larger (e.g., 10 seconds), the NN 32 may determine that the group with the longest delay has inadequate resources and may re-assign 104 one or more agents of the group with the shortest delay to the group with the longest delay.

Upon considering the resources of each group, the NN 32 may next consider whether or not to process a call. Processing a call may mean accepting an incoming call from the PSTN 14 or initiating an outgoing call. While the processing of incoming calls may be given priority over outgoing calls, it should be understood that either type may be given priority.

The NN 32 may determine the appropriateness of processing another call by again examining such things as a length of time a call spends in a call queue. If the time spent is determined to be excessive, the NN 32 may defer processing of another call. If the time spent in the queue is not excessive, the NN 32 may determine that another call should be processed.

Where incoming calls are given priority, the NN 32 may first check to see if there is a call waiting to be answered. If there is a call waiting to be answered, the NN 32 may signal the CD 32 to answer the call.

If there isn't a call waiting to be answered, the NN 32 may consider whether or not to initiate an outgoing call. In determining whether to initiate an outgoing call, a different set of weights may be used for reaching the determination. For example, it may be determined that outgoing calls should not be initiated before 8 am or after 5 pm or during the weekend. Consequently, the inputs associated with time of day and day of week would have a different neural network weight depending on the type of call processed.

Alternatively, the NN 32 may be used to control a ratio of incoming to outgoing calls. For instance, where an operator of the system 10 is a marketing organization, it may be more important (and profitable) to ensure that more calls go out than come in. Under this model, a NN 32 may be used to first initiate calls with some ratio (e.g., 2:1, 3:1, etc.) of outgoing to incoming calls.

Figure 3:
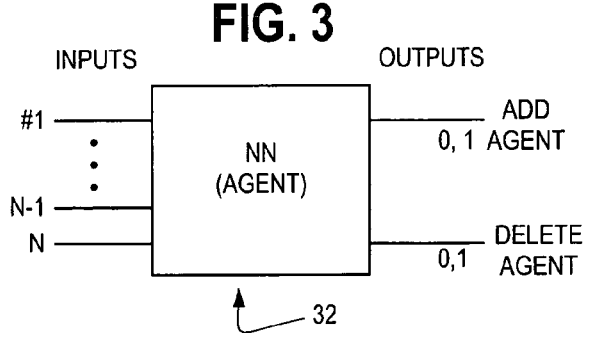
FIG. 3 is a neural network of the system of FIG. 1.

FIG. 3 is an example of a NN 32 that may be used for a determination of agent resources. Such a NN 32 may be maintained for each agent group associated with the ACD 10. As shown, the NN 32 for agent resources may periodically process n inputs to determine an agent resource status. Where it is determined that the group does not have enough agents, an "ADD AGENT" output may go to a "1" state to indicate the need to add an agent to a group. Where it is determined that there are too many agents in a group, a "DELETE AGENT" may go to a "1" state. The weights associated with adding agents may be different than the weights associated with deleting agents.

Where the NN 32 of one agent group signals a need for agents, the host 16 may simply looks for another group which is indicating that it has too many agents. Where a match is found, the host 16 may compare qualifications of the agents of the two groups and transfer an agent with the appropriate qualification. Once such a determination has been made, the host 16 may send a message to the CD 20 identifying the agent and indicating the source and destination agent groups.

Figure 4:
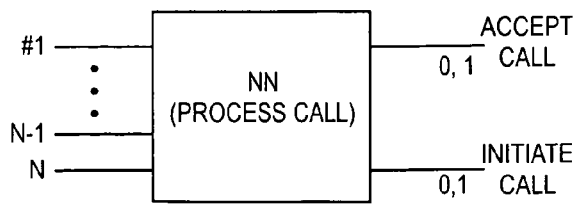
FIG. 4 is a neural network of the system of FIG.

FIG. 4 depicts a NN 32 that may be used for call processing. As shown, a first set of information inputs 1–n may be used for a determination of call acceptance. A determination to accept a call would cause the output "CALL ACCEPT" to go high.

Also shown, is an "INITIATE CALL" output. While the same set of inputs is shown as being used for "INITIATE CALL" and "CALL ACCEPT", it is to be understood that some inputs may used for "INITIATE CALL" and not used for "CALL ACCEPT" and visa versa. This may be accomplished by having a weighting value of zero in the one case and not the other, and visa versa.

The NNs 32 may be created in a manner well-known to those of skill in the art. For example, the host 16 may be an AS/400 by IBM with a software library containing a neural network utility. An Application Programming Interface (API) may be provided for the benefit of a supervisor working at a supervisors station 34 which allows the supervisor to access and use the neural network utility program. Prompts may be provided to enable the supervisor to select a neural network model such as the back propagation model.

The programmer may also be provided with prompts to initialize and train the neural network. Following initialization, the user may be prompted to identify a database within the host 16, which may be used to train each NN 32. Other screens may be provided through which the supervisor may input information and adjust the weights given to the input information.

Once the NN 32 has been trained, the NN 32 may be used to allocate system resources, as appropriate. The supervisor, working through the supervisors station 34 may periodically monitor and adjust weighting values of the NN 32 as appropriate to system performance.

A specific embodiment of a method and apparatus of a neural network for controlling calls in a telephone switch according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of processing calls in an automatic call distributor having a plurality of agent groups, such method comprising the steps of:
    training a system neural network with a set of desired resource relationships for servicing a plurality of call processing load conditions in the automatic call distributor;
    training a group neural network for each of the plurality of groups to periodically process a plurality of inputs to determine an agent resource status for each group;
    determining a set of operating parameters of the automatic call distributor;
    the system neural network determining whether to reassign agents among agent groups of the plurality of agent groups based upon the training of the neural network, the respective status of the agent groups, and a group loading of the determined set of operating parameters; and
    the neural system network determining whether to process calls for distribution to the plurality of agent groups based upon a call processor loading parameter of the determined set of operating parameters and the training of the neural network.

2. The method of processing calls as in claim 1 wherein the step of determining whether to process calls further comprises adjusting a ratio of inbound calls to outbound calls based upon the operating level of the automatic call distributor.

3. The method of processing calls as in claim 1 wherein the steps of training further comprise prompting the user to identify a database used to train the neural networks.

4. The method of processing calls as in claim 1 wherein the step of determining a set of operating parameters further comprises determining a number of calls that have been answered and are in a queue waiting to be assigned to an agent.

5. The method of processing calls as in claim 1 wherein the step of determining a set of operating parameters further comprises determining a number of available agents.

6. The method of processing calls as in claim 1 wherein the step of determining a set of operating parameters further comprises determining an average call waiting time of a call in a call queue.

7. The method of processing calls as in claim 1 wherein the step of determining a set of operating parameters further comprises determining an average call waiting time of a call for each group of the plurality of agent groups of the automatic call distributor.

8. The method of processing calls as in claim 1 wherein the step of determining a set of operating parameters further comprises determining a number of calls in a call queue for each group of the plurality of agent groups of the automatic call distributor.

9. The method of processing calls as in claim 1 wherein the step of determining a set of operating parameters further comprises determining an average waiting time between call arrival at the automatic call distributor and call acceptance.

10. The method of processing calls as in claim 1 wherein resource allocation is analyzed by the system neural network upon the receipt of each call request.

11. The method of processing calls as in claim 1 wherein the step of the system neural network determining whether to process another call for distribution to the plurality of agent groups based upon a call processor loading of the determined set of operating parameters and the training of the neural network further comprises the neural network processing a first set of inputs to determine whether to accept a call and processing a second set of inputs to determine whether to initiate a call.

12. Apparatus for processing calls in an automatic call distributor having a plurality of agent groups, such apparatus comprising:
    means for training a system neural network with a set of desired resource relationships for servicing a plurality of call processing load conditions in the automatic call distributor;
    means for determining a set of operating parameters of the automatic call distributor;
    means for training a group neural network for each of the plurality of groups to periodically process n inputs to determine an agent resource status for each group;
    means within the system neural network for determining whether to reassign agents among agent groups of the plurality of agent groups based upon the training of the neural network, the respective resource status of the agent groups, and a group loading of the determined set of operating parameters; and
    means within the system neural network for determining whether to process calls for distribution to the plurality of agent groups based upon a call processor loading parameter of the determined set of operating parameters and the training of the neural network.

13. The apparatus for processing calls as in claim 12 wherein the means for determining whether to process calls further comprises means for adjusting a ratio of inbound calls to outbound calls based upon the loading level of the automatic call distributor.

14. The apparatus for processing calls as in claim 12 wherein the means for training the system neural network further comprises means for prompting a supervisor to select a neural network model.

15. The apparatus for processing calls as in claim 12 wherein the means for determining the set of operating parameters further comprises means for determining a number of calls that have been answered and are in a queue waiting to be assigned to an agent.

16. The apparatus for processing calls as in claim 12 wherein the means for determining the set of operating parameters further comprises means for determining a number of available agents.

17. The apparatus for processing calls as in claim 12 wherein the means for determining the set of operating parameters further comprises means for determining an average call waiting time of a call in a call queue.

18. The apparatus for processing calls as in claim 12 wherein the means for determining the set of operating parameters further comprises means for determining an average call waiting time of a call for each group of the plurality of agent groups of the automatic call distributor.

19. The apparatus for processing calls as in claim 12 wherein the means for determining the set of operating parameters further comprises means for determining a number of calls in a call queue for each group of the plurality of agent groups of the automatic call distributor.

20. The apparatus for processing calls as in claim 12 wherein the means for determining the set of operating parameters further comprises means for determining an average waiting time between call arrival at the automatic call distributor and call acceptance.

21. Apparatus for processing calls in an automatic call distributor, such apparatus comprising:
- a system neural network trained with a set of desired resource relationships for servicing a plurality of call processing load conditions in the automatic call distributor;
- a determined set of operating parameters of the automatic call distributor;
- as a group neural network for each group of the plurality of groups trained to periodically process n inputs to determine an agent resource status for each group;
- the neural network being adapted to determine whether to reassign agents among agent groups of the plurality of agent groups based upon the training of the neural network the respective resource status of the agent groups, and a group loading of the determined set of operating parameters; and
- the system neural network being further adapted to determine whether to process calls for distribution to the plurality of agent groups based upon a call processor loading parameter of the determined set of operating parameters and the training of the neural network.

22. The apparatus for processing calls as in claim 21 wherein the neural network further comprises a proportioning processor adapted to adjust a ratio of inbound calls to outbound calls based upon the loading level of the automatic call distributor.

23. The apparatus for processing calls as in claim 21 wherein the call neural network further comprises a group processor adapted to reassign an agent of a first group to a second group.

24. The apparatus for processing calls as in claim 21 wherein the determined set of operating parameters further comprises a call counter adapted to determine a number of calls that have been answered and are in a queue waiting to be assigned to an agent.

25. The apparatus for processing calls as in claim 21 wherein the determined set of operating parameters further comprises an agent activity processor adapted to determine a number of available agents.

26. The apparatus for processing calls as in claim 21 wherein the determined set of operating parameters further comprises a call timer adapted to determine an average call waiting time of a call in a call queue.

27. The method of processing calls as in claim 10 further comprising each group neural network of the plurality of agent groups processing n inputs associated with the respective agent group within the determined set of operating parameters to determine that the agent group has too many agents or not enough agents.

28. The method of processing calls as in claim 27 further comprising a host of the automatic call distributor matching a group having too many agents with a group having not enough agents and transferring an agent with appropriate qualifications from the group having too many agents to the group having not enough agents.

29. A method of processing calls in an automatic call distributor having a plurality of agent groups, such method comprising the steps of:
- determining a set of operating parameters of the automatic call distributor;
- providing a group neural network for each agent group of the plurality of agent groups;
- training the group neural network of each agent group with a desired set of resource relationships for servicing a plurality of call processing load conditions of the group;
- each group neural network of the plurality of agent groups processing n inputs associated with the respective agent group within the determined set of operating parameters to determine a group status including an indicator that the agent group has too many agents or not enough agents; and
- a host of the automatic call distributor including a neural network adapted to determine whether to reassign agents by matching a group having too many agents with a group having not enough agents and transferring an agent with appropriate qualifications from the group having too many agents to the group having not enough agents based upon training of the neural network, the respective group status of the agent groups and at least one of the operating parameters.

30. The method of processing calls in the automatic call distributor as in claim 29 further comprising providing a neural network for determining whether to process a call for distribution to the plurality of agent groups based upon a call processor loading parameter within the determined set of loading parameters.

31. The method of processing calls in the automatic call distributor as in claim 30 providing a first set of weighted inputs to the call processing neural network for deciding whether to accept a call and a second set of weighted inputs to the call processing neural network for deciding whether to initiate a call.

32. The method of processing calls in the automatic call distributor as in claim 29 further comprising providing a first set of neural network input weights for determining that an agent group has too many agents and second set of neural network input weights for determining that a group has not enough agents, where the first and second sets of weights are different.

* * * * *